United States Patent
Chiou et al.

(10) Patent No.: US 7,241,709 B2
(45) Date of Patent: Jul. 10, 2007

(54) PENETRATION RESISTANT LIFE PROTECTION ARTICLES

(75) Inventors: Minshon J. Chiou, Chesterfield, VA (US); Larry John Prickett, Chesterfield, VA (US)

(73) Assignee: E. I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/625,586

(22) Filed: Jul. 23, 2003

(65) Prior Publication Data

US 2007/0105468 A1  May 10, 2007

Related U.S. Application Data

(60) Provisional application No. 60/405,930, filed on Aug. 26, 2002.

(51) Int. Cl.
  *B32B 5/26* (2006.01)
(52) U.S. Cl. ............. 442/246; 442/181; 442/197; 442/215; 442/239; 428/364; 428/365; 428/369; 428/371; 428/911; 2/2.5
(58) Field of Classification Search ............ 442/181, 442/239, 197, 215, 246; 428/364, 365, 369, 428/371, 911; 2/2.5
See application file for complete search history.

(56) References Cited

U.S. PATENT DOCUMENTS

| | | | |
|---|---|---|---|
| 3,094,511 A | 6/1963 | Hill, Jr. et al. | |
| 3,354,127 A | 11/1967 | Hill, Jr. et al. | |
| 3,673,143 A | 6/1972 | Bair et al. | |
| 3,819,587 A | 6/1974 | Kwoleck | |
| 3,869,429 A | 3/1975 | Blades | |
| 4,172,938 A | 10/1979 | Mera et al. | |
| 4,457,985 A | 7/1984 | Harpell et al. | |
| 4,916,000 A * | 4/1990 | Li et al. ............ | 428/105 |
| 5,185,195 A | 2/1993 | Harpell et al. | |
| 5,565,264 A | 10/1996 | Howland | |
| 5,578,358 A | 11/1996 | Foy et al. | |
| 5,622,711 A | 4/1997 | Chen | |
| 5,622,771 A | 4/1997 | Chiou et al. | |
| 5,837,623 A * | 11/1998 | Howland ............ | 442/189 |
| 5,853,885 A * | 12/1998 | Prickett ............ | 428/401 |
| 5,976,996 A | 11/1999 | Howland | |
| 6,103,646 A | 8/2000 | Chiou | |
| 6,119,575 A | 9/2000 | Dragone et al. | |
| 6,133,169 A * | 10/2000 | Chiou et al. ........ | 442/234 |
| 6,195,798 B1 | 3/2001 | Bachner, Jr. | |
| 6,720,277 B1 * | 4/2004 | Howland ............ | 442/208 |
| 2004/0011088 A1 * | 1/2004 | Rebouillat et al. ...... | 66/174 |

FOREIGN PATENT DOCUMENTS

| | | |
|---|---|---|
| WO | WO 93/20400 | 10/1993 |
| WO | WO 01/96111 | 12/2001 |
| WO | WO 01/96805 A2 | 12/2001 |

OTHER PUBLICATIONS

Lord and Mohamed, Weaving: Conversion of Yarns to Fabric, Published by Merrow (1982), pp. 141-143.

(Continued)

*Primary Examiner*—Norca L. Torres Velazquez

(57) ABSTRACT

The present invention relates to penetration resistant life protection articles, including spike penetration resistant life protection articles, and preferably spike and ballistic projectile penetration resistant life protection articles.

17 Claims, 1 Drawing Sheet

OTHER PUBLICATIONS

Figure 1:
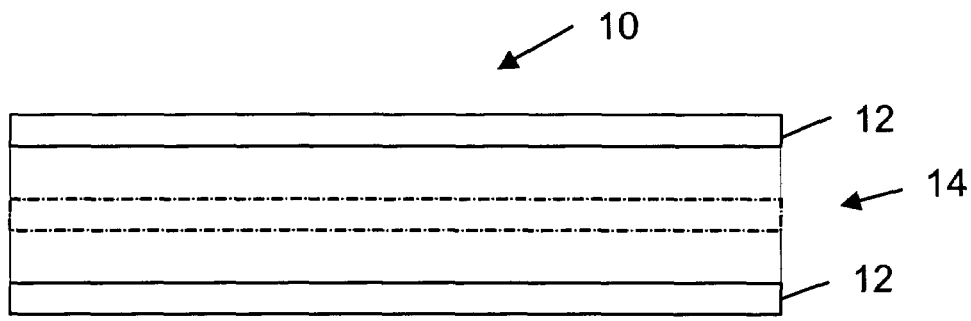

J.B. Dickson, All Fiber System Meets Needs, Fabric Engineering, vol. 102, pp. 113-250 of Textile World (1952).

NIJ Standard—0101.04 dated Sep. 2000.
NIJ Standard—0115.00 dated Sep. 2000.

* cited by examiner

PENETRATION RESISTANT LIFE PROTECTION ARTICLES

BACKGROUND OF THE INVENTION

1. Field of the Invention

This invention relates to penetration resistant life protection articles, specifically spike resistant life protection articles, and, more specifically, to spike and ballistic projectile life protection penetration resistant articles.

2. Description of Related Art

New penetration resistant articles are continually being developed because standards and requirements are continually being adopted or upgraded to provide protection from life threatening forces.

In September 2000, the National Institute of Justice (NIJ) issued NIJ Standard-0115.00 entitled "Stab Resistance of Personal Body Armor" and NIJ Standard-0101.04 entitled "Ballistic Resistance of Personal Body Armor". In view of these new Standards, there is a need for light-weight, comfortable and flexible protective garments exhibiting improved penetration against spike threats, or spike threats and ballistic threats, that can be worn on a daily basis to provide adequate protection, such as, for corrections, police, military and other security officers depending on their specific job requirement and working environment.

U.S. Pat. No. 5,578,358 (to Foy et al.) and U.S. Pat. No. 5,622,711 (to Chiou et al.) disclose spike penetration resistant articles made from woven aramid yarns having a particular combination of linear density of the yarn and tightness factor of the fabric made from the yarn. These patents use yarns having a toughness of at least 30 Joules per gram.

U.S. Pat. No. 6,103,646 to Chiou discloses spike and ballistic projectile penetration resistant articles. These articles have spike penetration resistant layers and ballistic projectile penetration resistant layers with the spike penetration resistant layers on the outer side or strike face of the article.

U.S. Pat. No. 5,565,264 to Howland discloses a protective fabric that is highly densely woven. That is, the yarn cross sections have been distorted by weaving into roughly square shapes to form an overly tight interlocking structure to resist yarn movement.

U.S. Pat. Nos. 5,837,623 and 5,976,996, both to Howland, disclose protective fabric substrates made of highly densely woven yarns, including staple yarns. These patents teach that staple yarns are used only where the fabric will undergo slight tensile or tear loading, and that the use of coating on fabric can enhance its stiffness and improve its performance against tensile and tear loading. The cover of densely woven fabrics disclosed in these patents is significantly high, i.e., in the order of 130% to 140%. The fabric tightness factors for fabrics disclosed in these patents are greater than 1.15. Such fabrics are generally very stiff, lack drapeability, and have limited flexibility, regardless of the types of yarns used, because of the highly densely woven substrate of the fabric.

In view of the above, it is an object of this invention to provide an improved flexible light weight article that resists penetration by spikes, and optionally also ballistic projectiles.

BRIEF SUMMARY OF THE INVENTION

The invention relates to a penetration resistant life protection article, comprising:

a plurality of flexible spike penetration resistant layers having an areal density of 0.5 to 6.0 kilograms per square meter, each of the layers made of woven fabric;

the woven fabric having a fabric tightness factor of 0.75 to 1.15 and made from yarns;

the yarns having a linear density of 500 dtex or less, a tenacity of 3 to 20 grams per dtex, and an energy to break of 8 to less than 30 Joules per gram, the yarns further comprising staple fibers; and the staple fibers having a linear density of 0.2 to 7.0 dtex per fiber.

In accordance with a second embodiment, the present invention additionally includes a second plurality of layers resistant to ballistic projectiles.

BRIEF DESCRIPTION OF THE DRAWING(S)

The invention can be more fully understood from the following detailed description thereof in connection with accompanying drawings described as follows.

FIG. 1 shows a schematic illustration of penetration resistant life protection article with spike resistant layers according to the present invention.

Figure 2A:
Figure 2B:
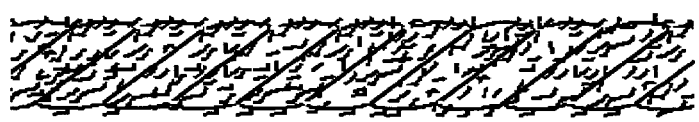
Figure 2C:

FIGS. 2A-C show schematic illustrations of an intermingled staple yarn, a twisted staple yarn, and an intermingled continuous multifilament yarn, respectively.

Figure 3:
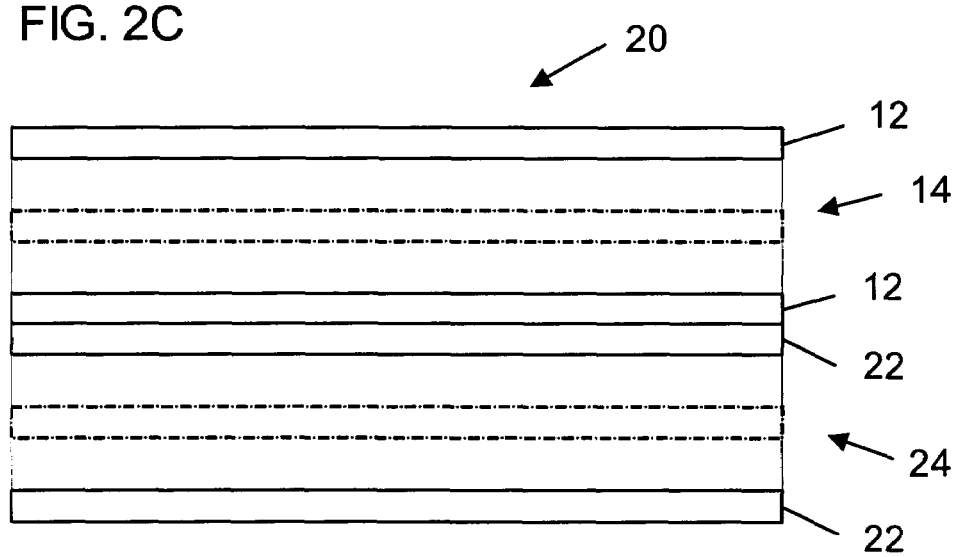

FIG. 3 shows a schematic illustration of penetration resistant life protection article with spike resistant layers and ballistic projectile resistant layers according to the present invention.

DETAILED DESCRIPTION OF THE INVENTION

The present invention is directed to penetration resistant life protection articles, including spike penetration resistant life protection articles, and spike and ballistic projectile penetration resistant life protection articles.

In one embodiment, the penetration resistant life protection article 10 comprises a plurality of flexible spike resistant layers 12,14 made of woven fabric. In FIG. 1, the number 14 designates the third or more layers that optionally can be included in the article. The woven fabric is made from yarns. The yarns comprise staple fibers.

(1) Layers

The article 10 contains a plurality of flexible spike penetration resistant layers 12,14.

The spike resistant layers 12,14, combined, have an areal density of 0.5 to 6.0 kilograms per square meter, and preferably, 1.0 to 5.0 kilograms per square meter. When the areal density of the layers is less than 0.5, the layers 12,14 provide inadequate life protection. When the areal density of the combined plurality of layers exceeds 6.0 kilograms per square meter, the combined layers 12,14 normally becomes too bulky, heavy and rigid rendering it uncomfortable to wear. When the areal density is too great, it hinders the wearer's ability to move and maneuver quickly, and causes significant fatigue to the wearer over an extended period of wear.

The greater the number of layers 12,14, the greater the areal density of the combined layers 12,14. The lower the linear density of the staple yarns making up the fabrics of the layers 12,14, the greater the number of layers 12,14 that can be used with an acceptable areal density of the combined layers 12,14. For instance, when the fabrics are made of 220 decitex staple yarn in both the warp and the fill directions, the number of woven fabric layers 12,14 is in the range of 3 to 50. In contrast, when the fabrics are made of 110 decitex staple yarn in both the warp and the fill directions, the number of woven fabric layers 12,14 is in the range of 6 to 80.

The layers 12,14 can be held together or joined in any manner, such as, by being sewn together or they can be stacked together and held, for example, in a fabric envelope or carrier. The layers 12,14 can be divided into sections which can be separately stacked and joined, or all of the plurality of layers 12,14 can be stacked and joined as a single unit. Preferably, the layers 12,14 or layer sections are joined together at the corners, or at points spaced apart along the edges, of the layers 12,14, and are otherwise substantially free from means for holding the layers 12,14 of fabric together. Alternatively, the layers 12,14 or layer sections can be attached together at points or small regions spaced about 15 or more centimeters apart. Providing substantial mobility of the layers 12,14 with respect to each adjacent layer, such as described above, improves the resistance against greater spike forces, but may reduce the resistance against bullet projectiles.

A combination of the layers 12,14 or layer sections of this invention is made by placing them together, in face to face relation, with or without other layer materials there between, as desired. Other layer materials, which may be placed among the layers 12,14 or layer sections, include, for example, water proofing materials, anti-trauma materials, and the like.

(2) Fabric

The layers 12,14 are made of woven fabric. By woven is meant any fabric weave, such as, plain weave, crowfoot weave, basket weave, satin weave, twill weave, and the like. Plain weave is the most common.

The fabric of the layers 12,14 is "tightly woven" which means that it has a tightness factor of 0.75 to 1.15 and preferably 0.85 to about 1.10. It is most preferred that the tightly woven fabric layers 12,14 have a relationship between the yarn linear density (dtex) and the fabric tightness factor as follows:

$$Y > \text{ or } = X6.25 \text{ times } 10^{-4} + 0.69 \quad (1)$$

wherein Y=fabric tightness factor and X=yarn linear density, as disclosed in the aforementioned U.S. Pat. No. 5,578,358.

"Fabric tightness factor" and "Cover factor" are names given to the density of the weave of a fabric. Cover factor is a calculated value relating to the geometry of the weave and indicating the percentage of the gross surface area of a fabric which is covered by yarns of the fabric. Cover factor can be calculated various ways as is well known in the art. For instance, The method used to calculate Cover factor can be as follows (from Weaving: Conversion of Yarns to Fabric, Lord and Mohamed, published by Merrow (1982), pages 141-143):

dw=width of warp yarn in the fabric
df=width of fill yarn in the fabric
Pw=pitch of warp yarns (ends per unit length)
pf=pitch of fill yarns $$\text{Cover Factor in warp direction} = C_w \quad (2)$$

$$= \frac{d_w}{p_w}$$

$$\text{Cover Factor in fill direction} = C_f \quad (3)$$

$$= \frac{d_f}{p_f}$$

$$\text{Fabric Cover Factor} = C_{fab} \quad (4)$$

$$= \frac{\text{total area obscured}}{\text{area enclosed}}$$

$$C_{fab} = \frac{(p_w - d_w)d_f + d_w p_f}{p_w p_f} \quad (5)$$

$$= (C_f + C_w - C_f C_w)$$

The widths of the warp and fill yarns, $d_w$ and $d_f$, can be calculated various ways known in the art, such as, following the teachings in "All-Fiber System Meets Needs Fabric Engineering" by J. B. Dickson, Vol. 102, p. 113-250 of Textile World (1952).

Depending on the kind of weave of a fabric, the maximum cover factor may be quite low even though the yarns of the fabric are situated close together. For that reason, a more useful indicator of weave tightness is called the "fabric tightness factor". The fabric tightness factor is a measure of the tightness of a fabric weave compared with the maximum weave tightness as a function of the cover factor.

$$\text{Fabric tightness factor} = \frac{\text{actual cover factor}}{\text{maximum cover factor}} \quad (6)$$

For example, the maximum cover factor which is possible without jamming of the yarns in the fabric for a plain weave fabric is 0.75; and a plain weave fabric with an actual cover factor of 0.68 will, therefore, have a fabric tightness factor of 0.91, and a plain weave fabric with an actual cover factor of 0.83 will, therefore, have a fabric tightness factor of 1.1. The preferred weave for practice of this invention is plain weave.

(3) Yarns

The woven fabric is made from yarns. The yarns have a linear density of 500 dtex or less, and preferably at least 25 dtex. The yarns have a tenacity of 3 to 20 grams per dtex, and preferably 5 to 16 grams per dtex. The yarns have an energy to break (or toughness) of 8 to less than 30 Joules per gram, and preferably 10 to 25 Joules per gram. The yarns preferably have an elongation at break of at least 2.0 percent and there is no known upper limit for elongation at break. Elongation to break that is less than 2.0 percent typically results in a yarn which is brittle.

The yarns in the plurality of fabric layers comprise staple fibers. See FIG. 2A which is a schematic illustration of an intermingled staple yarn. The yarns can solely be staple yarns. However, the woven fabric can be made of a plurality of yarns made of staple fibers and other yarns comprising continuous mulitfilament yarn. See FIG. 2C which is a schematic illustration of an intermingled continuous multifilament yarn. Any fabric construction using both staple yarns and continuous multifilament yarns are possible such as a fabric construction (a) with staple yarns and continuous multifilament yarns alternating in either or both of the warp and fill directions, (b) with two or more continuous multifilament yarns then a staple yarn in either or both of the warp and fill directions, or (c) with two or more staple yarns then a continuous multifilament yarn in either or both of the warp and fill directions.

The article 10 can include a plurality of layers 12,14 of woven fabric made solely or partly with staple yarn and one or more layer made of woven fabric made solely of continuous multifilament yarn. For instance, the article 10 can comprise a repeating assembly of one or more layers made from continuous multifilament yarn stacked next to one or more layers 12,14 made solely or partly from staple yarn.

When the article includes at least one layer of woven fabric made of yarn including continuous multifilaments, preferably such fabric has a fabric tightness factor of at least 0.75 and such yarn has a linear density of less than 500 dtex.

Furthermore, the yarns used to make a woven fabric in a layer, or in different layers, can be made from a single polymer, different polymers, a copolymer, different copolymers, or mixtures thereof. Suitable polymers and copolymers are described herein.

The yarns can be twisted and have a twist level in the range of no more than a 5 twist multiplier. See FIG. 2B which is a schematic illustration of a twisted staple yarn. By twist multiplier is meant the ratios of twist in yarn in turns per inch to the square root of the yarn count. Twisted effectively means that one end of the yarn is held stationary and the other end is turned or rotated about the yarn longitudinal axis to impose twist to the yarn. A twisted yarn has a twist multiplier which can be calculated as follows:

$$\text{Twist Multiplier} = tpi * sqrt(denier)/73 \quad (7)$$

$$= tpc * sqrt(dtex)/30.3 \quad (8)$$

$$= tpi/sqrt(\text{cotton count}) \quad (9)$$

wherein: tpi=turns per inch,
tpc=turns per centimeter, and
cotton count=the number of 840-yard skeins required to weigh 1 pound.

The yarns can comprise a plurality of yarns plied (i.e., combined) and twisted together. When two yarns are plied and twisted together, it is called a two ply yarn. The twist of the ply yarn will be in the opposite direction of any twist in the individual yarns in the ply yarn. One or more of the plied yarns can be a continuous multifilament yarn.

The number of the yarns or ends in the warp and fill directions can be the same or different. The linear density of the yarns or ends in the warp and fill directions, or even in the same direction, can be the same or different. The greater the linear density of the yarns in the woven fabric, the smaller the number of ends per unit length are needed to provide adequate life protection with acceptable flexibility and comfort.

(4) Fibers

The yarns are made of staple fibers. For purposes herein, the term "fiber" is defined as a relatively flexible, macroscopically homogeneous body having a high ratio of length to width across its cross-sectional area perpendicular to its length. The fiber cross section can be any shape, but is typically round. The term "filament" is used interchangeably with the term "fiber".

The staple fibers can be intermingled; the yarn can be twisted; other both. When a yarn is made of "intermingled" staple fibers it is a consolidated unit of discontinuous fibers intermingled or entangled along the length of the yarn to maintain the unity of the yarn.

The staple fibers have a linear density of 0.2 to 7.0 dtex per fiber, and preferably 0.4 to 5.0 dtex per fiber.

The staple fibers have (a) substantially uniform length, (b) variable or random length, or (c) subsets of the staple fibers have substantially uniform length and the staple fibers in the other subsets have different lengths, with the staple fibers in the subsets mixed together forming a substantially uniform distribution.

Suitable staple fibers have a length of 1 to 30 centimeters. Staple fibers made by short staple processes result in a fiber length of 1 to 6 centimeters.

The staple fibers can be made by any process. The staple fibers can formed by stretch breaking continuous fibers resulting in staple fibers with deformed sections that act as crimps. The staple fibers can be cut from continuous straight fibers resulting in straight (i.e., no crimped) staple fiber, or additionally cut from along the length of the staple fiber, with a crimp (or repeating bend) frequency of no more than 8 crimps per centimeter.

The fibers can be present in uncoated, or coated, or otherwise pretreated (for example, pre-stretched or heat-treated) form. In case polyaramid fiber is used, it is generally no necessary to coat or otherwise pre-treat the fiber.

Stretch broken staple fibers can be made by breaking a tow or a bundle of continuous filaments during a stretch break operation having one or more break zones that are a prescribed distance creating a random variable mass of fibers having an average cut length controlled by break zone adjustment. Such yarns tend to have tenacities in the range of about 4 to 15 grams per denier (i.e., about 3 to 13.5 grams per dtex) depending on the average fiber length. Stretch broken fibers are not crimped because the process imparts a degree of crimp into the fiber due to recoil and subsequent compressive deformation after breaking Staple fibers of this invention can be converted into yarns using traditional long and short staple ring spinning processes which are well known in the art. For short staple, cotton system spinning fiber lengths from ¾ inch to 2¼ inch (i.e., 1.9 to 5.7 cm.) are typically used. For long staple, worsted or woolen system spinning, fibers up to 6½ inches (i.e., 16.5 cm.) are typically used. However, this is not intended to be limiting to ring spinning because the yarns may also be spun using air jet spinning, open end spinning, and many other types of spinning which converts staple fiber into useable yarns.

The stretch broken staple fibers typically have length of up to 7 inches (i.e., 17.8 cm.) long and can be made using traditional stretch-broken tow to top staple processes. Staple fibers having maximum lengths of up to around 20 inches (i.e., 51 cm) are possible through processes as described for example in International Publication WO 0077283. Yarns are so made by consolidated fibers into spun yarn using filament entanglement with air jets having a tenacity in the range of 3 to 7 grams per decitex. These yarns may have secondary twist, that is, they may be twisted after formation to impart more tenacity to the yarn, in which case the tenacity can be in the 10 to 18 grams per denier (i.e., 9 to 17 grams per dtex) range. Stretch broken staple fibers normally do not require crimp because the process imparts a degree of crimp into the fiber.

Use of yarns made of staple fibers, instead of continuous fibers, provides numerous advantages. When yarns of staple fibers are used, one can design article specifications with more varieties of linear density of yarns than possible with continuous multifilament yarns. Manufacturers of continuous filament yarns only make a limited number of yarn linear densities. Changing a spinning process from producing a yarn of one linear density to a different linear density causes lost production time and labor costs. In order to produce a linear density yarn not previously produced, additional costs are required such as to design and install the necessary spinnerets and other process equipment changes that may be needed. However, yarns of staple fibers can be made from yarns made of various continuous fibers.

Also, staple yarns with linear density less than 500 decitex are significantly less expensive than continuous multifilament yarns. Further, the demand for continuous multifilament yarns of certain linear densities may be greater than capacity to make such yarns. When this is the case, continuous multifilament yarns of other linear densities with excess manufacturing capacity or inventory can be used to produce the desired staple yarns as a substantial cost savings.

Further, use of yarns made of staple fibers enables yarns to be made with an intimate mixture or blend of high performance fibers made of different polymers or copolymers. This is not feasible with today's manufacturing equipment for making continuous multifilament yarns.

The use of staple yarns also increase the ability to conform an article to the contours of the wearer's body shape.

Fiber Polymer

The fibers are made of polyamide fibers, polyolefin fibers, polybenzoxazole fibers, polybenzothiazole fibers, poly{2,6-diimidazo[4,5-b4',5'-e]pyridinylene-1,4(2,5-dihydroxy)phenylene} (PIPD) fiber, or mixtures thereof. Preferably, the fibers are made of polyamide.

When the polymer is polyamide, aramid is preferred. By "aramid" is meant a polyamide wherein at least 85% of the amide (—CO—NH—) linkages are attached directly to two aromatic rings. Suitable aramid fibers are described in Man-Made Fibers—Science and Technology, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511.

Additives can be used with the aramid and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride or the aramid.

The preferred aramid is a para-aramid and poly(p-phenylene terephthalamide) (PPD-T) is the preferred para-aramid. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

When the polymer is polyolefin, polyethylene or polypropylene are preferred. By polyethylene is meant a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. Such is commonly known as extended chain polyethylene (ECPE). Similarly, polypropylene is a predominantly linear polypropylene material of preferably more than one million molecular weight. High molecular weight linear polyolefin fibers are commercially available. Preparation of polyolefin fibers is discussed in U.S. Pat. No. 4,457,985.

Polybenzoxazole (PBO) and polybenzothiazole (PBZ) are suitable, such as described in WO 93/20400. Polybenzoxazole and polybenzothiazole are preferably made up of repetitive units of the following structures:

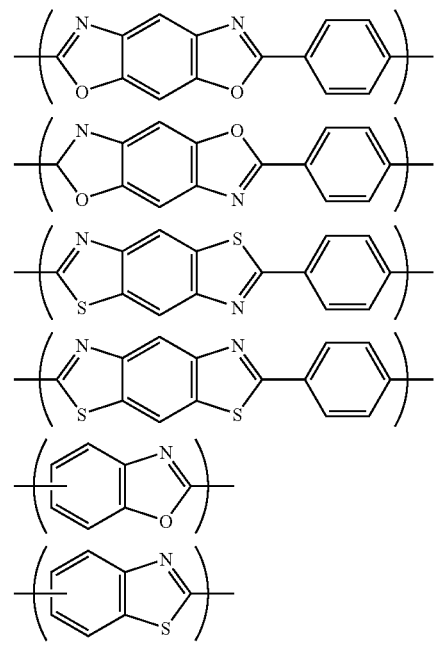

While the aromatic groups shown joined to the nitrogen atoms may be heterocyclic, they are preferably carbocyclic; and while they may be fused or unfused polycyclic systems, they are preferably single six-membered rings. While the group shown in the main chain of the bis-azoles is the preferred para-phenylene group, that group may be replaced by any divalent organic group which doesn't interfere with preparation of the polymer, or no group at all. For example, that group may be aliphatic up to twelve carbon atoms, tolylene, biphenylene, bis-phenylene ether, and the like.

The polybenzoxazole and polybenzothiazole used to make fibers of this invention should have at least 25 and preferably at least 100 repetitive units. Preparation of the polymers and spinning of those polymers is disclosed in the aforementioned International Publication WO 93/20400.

Articles

The articles of the present invention are preferably constructed entirely of woven fabric without rigid plates or platelets and without matrix resins impregnating the fabric materials. As a result, the articles of this invention are more flexible and lighter in weight than penetration resistant constructions of the prior art offering comparable protection.

The article 10 of the present invention preferably meets at least the Level 1, more preferably the Level 2, and most preferably the Level 3, performance requirement against spike as described in NIJ Standard-0115.00 entitled "Stab Resistance of Personal Body Armor" dated September 2000. In accordance with the present invention, numerous article specifications are possible that meet this Standard. For instance, when the woven fabrics in the layers are made from staple yarns of 220 decitex in both the warp and fill directions, the number of staple fibers or ends in the warp and fill directions can be 60 to 90 and, depending on the number of staple fibers or ends that are selected in this range, the number of layers can be 3 to 50. Corresponding variations for article specifications exist when staple yarns of different linear density are used.

The article 20, as illustrated in FIG. 3, can optionally comprise a second plurality of layers 22 resistant to ballistic projectiles. In FIG. 3, the number 24 designates the third or more ballistic projectile resistant layers that optionally can be included in the article. Article 20 of the present invention preferably meets at least the Type IIA, more preferably the Type II, and most preferably the Type IIIA, ballistic performance requirement against projectiles as described in NIJ Standard-0101.04 entitled "Ballistic Resistance of Personal Body Armor" dated September 2000. Any ballistic projectile resistant layer known in the art can be used herein. Different materials or constructions can be used for different ballistic projectile resistant layers. Suitable ballistic projectile resistant layers are described in U.S. Pat. Nos. 6,119,575 and 6,195,798, and International Publication WO 01/96111A1.

The term "article" is used herein to mean at least two flexible spike resistant layers as described herein. The article can include at least two layers resistant to ballistic projectiles. The article can include other layers or materials, such as water proofing materials, anti-trauma materials, and carriers or covers or stitching or adhesive to keep layers together.

The term "life protection" means that the articles resist penetration against certain life threatening forces such as spikes and preferably ballistic projectiles. Spikes are sharp or pointy objects, like ice picks. The term "projectile" is used herein to mean a bullet or other object or fragment thereof, such as, fired from a gun.

Life protection articles protect portions of the body that when severely injured could cause death. Such portions include torso, groin, neck, and head. As such, life protection articles include protective apparel or body armor that protect these parts, such as vests, jackets, etc.

Test Methods

The following test methods were used in the following Examples.

Linear Density. The linear density of a yarn or fiber is determined by weighing a known length of the yarn or fiber based on the procedures described in ASTM D1907-97 and D885-98. Decitex or "dtex" is defined as the weight, in grams, of 10,000 meters of the yarn or fiber.

Tensile Properties. The fibers to be tested are conditioned and then tensile tested based on the procedures described in ASTM D885-98. Tenacity (breaking tenacity), elongation to break, and modulus of elasticity are determined by breaking test fibers on an Instron tester.

Areal Density. The areal density of the fabric layer is determined by the standard test method of ASTM D 3776-96 for mass per unit area (weight) of fabric. The areal density of the composite structure is determined by the sum of the areal densities of the individual layers.

Crimp Frequency. Measurement of crimp frequency of manufactured staple fiber is determined by the standard test method of ASTM D 3937-01 (1995).

Cut Length. Measurement of the length and length distribution of manufactured staple fibers is determined by the standard test method of ASTM D 5103-01 (1995).

Spike Stab Resistance. Spike resistance tests of the multi-layer panels are conducted in accordance with NIJ Standard-0115.00 "Stab Resistance of Personal Body Armor" for protection class of spike, issued in September 2000.

Ballistic Performance. Ballistic tests of the multi-layer panels are conducted in accordance with NIJ Standard-0101.04 "Ballistic Resistance of Personal Body Armor", issued in September 2000.

EXAMPLES

This invention will now be illustrated by the following specific examples.

Preparation of Yarns

The following different type of yarns made from poly(p-phenylene terephthalamide) fiber commercially available from E. I. du Pont de Nemours and Company ("DuPont") under the trademark KEVLAR® are prepared:

Yarn #1:

Yarn #1 is 220 dtex poly(p-phenylene terphthalamide) continuous filament yarn, available from DuPont under the trademark KEVLAR®, with a nominal tenacity of 24.5 grams per dtex, a nominal modulus of 630 grams per dtex, a nominal elongation to break of 3.4%, and a nominal linear density of 1.67 dtex per fiber. The energy to break of the yarn is 37.7 J/g which is greater than 30 J/g.

Yarn #2:

Yarn #2 is 660 dtex (18/2s English cotton count), 1.67 dtex per filament (1.5 dpf) KEVLAR® short staple, cotton system ring spun yarn. The energy to break of the yarn is 11.5 J/g which is less than 30 J/g, but greater than 8 J/g, and the nominal tenacity is 7.8 grams per dtex, and the nominal elongation to break is 4.05%. This yarn is produced using 4.8 cm square cut, uniform length 1.67 dtex per filament staple fibers. These staple fibers are converted into yarns using short staple spinning technology incorporating a variety of equipment well known to the trade. The ring spinning short staple process used to make yarn for this example involves (1) a carding process where staple fibers are converted into carded sliver, (2) multiple pass drawing process (breaker/intermediate/finisher drawing) where multiple carded slivers are converted into finished drawn sliver, (3) a roving process where drawn sliver is processed into roving, (4) a ring spinning process where roving is ring twisted into spun yarn, (5) a clearing process to remove unwanted defects from the ring spun yarn, and (6) a winding process forming a package of the yarn on a cone.

Yarn #3:

Yarn #3 is 220 dtex (26.6/1s English cotton count), 1.67 dtex per filament (1.5 dpf) KEVLAR® stretch break ring spun yarn. The energy to break of the yarn is 9.2 J/g, which is significantly less than 30 J/g, but greater than 8 J/g, and the nominal tenacity is 8.6 grams per dtex, and the nominal elongation to break is 2.44%. This yarn is produced from stretch broken, variable length 1.7 dtex per filament staple fibers with a typical average length between 7 and 11 cm (about 3 to about 5 inches). These staple fibers are produced and converted into spun staple yarns using "tow to top" long staple worsted sing spinning technology incorporating a variety of equipment well known to the trade. The process used to make yarn for this example involves (1) a stretch breaking process where a tow containing a plurality of continuous filament yarns is stretched and broken into random lengths to make "top", (2) a multiple pass pin drafting process, also known as gilling, (breaker/intermediate/finisher drawing) where multiple stretch broken slivers, or "top" are converted into finished drawn sliver, (3) a roving process where drawn sliver is processed into roving, (4) a ring spinning process where roving is ring twisted into spun yarn, (5) a clearing process to remove unwanted defects from the ring spun yarn, and (6) a winding process to package the yarn on cones.

Yarn #4:

Yarn #4 is 930 dtex poly(p-phenylene terphthalamide) continuous filament yarn, available from DuPont under the trademark KEVLAR®, with a nominal tenacity of 24.1 grams per dtex, a nominal modulus of 630 grams per dtex, a nominal elongation to break of 3.4%, and a nominal linear density of 1.67 dtex per fiber. The energy to break of the yarn is 44.3 J/g, which is greater than 30 J/g.

Preparation of Layers

The above yarns are made into layers of the following fabrics for tests at various areal densities:

(1) Plain weave fabric of 220 dtex Yarn #1, is made at 70×70 ends per inch (27.6×27.6 ends per centimeter) with a fabric tightness factor of 1.0 and is used as a control. This layer is identified as layer "A".

(2) Plain weave fabric of 660 dtex Yarn #2 is made at 34×34 ends per inch (13.4×13.4 ends per centimeter) with a fabric tightness factor of 0.88. This layer is identified as layer "B".

(3) Plain weave fabric of 220 dtex Yarn #3 is made at 70×70 ends per inch (27.6×27.6 ends per centimeter) with a fabric tightness factor of 1.0. This layer is identified as layer "C".

(4) Plain weave fabric of 930 dtex Yarn #4 is made at 26×26 ends per inch (10.2×10.2 ends per centimeter) with a fabric tightness factor of 0.82. This layer is identified as layer "D".

Invention Example 1 and Comparative Examples 2, 3, and 4

In Example 1 of the invention, fabric layers of "C" were made into samples of various composite structures of this invention on which to conduct stab tests against spike. In the Comparative Examples 2, 3 and 4, fabric layers of "A", "B" and "D" were made into composite structures on which to conduct the stab test against spike. Stab tests against spike to be conducted were based on the test protocol for Level 1 as described in NIJ Standard 0115.00 entitled "Stab Resistance of Personal Body Armor" dated September 2000. The test protocol specifies a maximum allowable penetration of no more than 7 mm when tested at 24 Joules, and no more than 20 mm when tested at 36 Joules, in order to meet the Level 1 performance requirement. Results of the stab tests against spike are shown in Table 1.

TABLE 1

| Example Number | Yarn Energy to Break (J/g) | Construction | Areal Density (kg/m2) | Penetration depth (mm) @ 24 J | Penetration depth (mm) @ 36 J |
|---|---|---|---|---|---|
| Inv Ex. 1 | 9.2 | 26 layers "C" | 3.2 | 0 (<7) | 15 (<20) |
| Comp Ex. 2 | 37.7 | 16 layers "A" | 2.0 | 0 | 0 |
| Comp Ex. 3 | 11.5 | 32 layers "B" | 7.0 | 19 | 22 |
| Comp Ex. 4 | 44.3 | 64 layers "D" | 12.8 | 36 | 61 |

Results of stab test on the article of this invention against spike, showed good stab resistance at NIJ stab Level 1 with an areal density of 3.2 kg/m², i.e., penetration of less than 7 mm when tested at 24 joules and less than 20 mm when tested at 36 joules, in spite of the significantly low energy-to-break, i.e. 9.2 J/g, of the yarn. While the Comparative Ex. 2 also showed good stab resistance, the energy-to-break for the yarn required was very high, i.e., higher than 30 joules per gram, which normally is very costly to manufacture. The results of Comparative Ex. 3 and Comparative Ex. 4 showed very poor stab resistance against spike even at a very high areal density of 7.0 kg/m2 and 12.8 kg/m2, respectively.

Invention Example 5

Ballistic tests, and stab tests against the spike, on a sample made from 22 layers of "C" at the striking face and 16 layers of "D" at the inner face against the body to be conducted are based on the ballistic test protocol Level IIA as described in NIJ Standard 0101.04 entitled "Ballistic Resistance of Personal Body Armor" dated September 2000 and stab Level 1 against spike as described in NIJ Standard 0115.00 entitled "Stab Resistance of Personal Body Armor" dated September 2000. Results of the tests are shown in the Table 2 below

TABLE 2

| Example Number | Areal Density (kg/m²) | Penetration depth (mm) @ 24 J | Penetration depth (mm) @ 36 J | NIJ Level IIA Backface Deformation (mm) 9 mm | NIJ Level IIA Backface Deformation (mm) 357 mag | V50 (m/sec) 9 mm | V50 (m/sec) 357 mag |
|---|---|---|---|---|---|---|---|
| Inv Ex. 5 | 5.9 | 0 (<7) | 13 (<20) | 35 (<44) | 41 (<44) | 455 | 409 |

The stab resistant test on the combined layers of this sample of the invention against the spike showed very good stab resistance against NIJ stab Level 1, i.e., penetration of <7 mm when tested at 24 Joules and <20 mm when tested at 36 Joules. Ballistic V50s and backface deformation tests were also conducted on the combined layers. The sample article of this invention of combined layers exhibited good ballistic V50 of 455 m/sec against 9 mm bullet and 409 m/sec against 40 S&W bullet with backface deformation of less than 44 mm against both 9 mm and 40 S&W bullets to meet NIJ ballistic Level IIA.

What is claimed is:

1. A penetration resistant article, comprising:
    a plurality of flexible layers having an areal density of 0.5 to 6.0 kilograms per square meter, each of the layers made of woven fabric;
    the woven fabric having a fabric tightness factor of 0.75 to 1.15 and made from ply yarn which comprises a plurality of yarns plied and twisted together in an opposite direction of twist in the plurality of yarns in the ply yarn and without matrix resin impregnating the fabric;
    the yarns having a linear density of 500 dtex or less, a tenacity of 3 to 16 grams per dtex, and an energy to break of 8 to less than 30 Joules per gram, the yarns further comprising staple fibers; and
    the staple fibers having a linear density of 0.2 to 7.0 dtex per fiber.

2. The penetration resistant article of claim 1, wherein the staple fibers have (a) substantially uniform length, (b) variable length, or (c) subsets of the staple fibers having substantially uniform length and the staple fibers in the other subset(s) having different lengths, with the staple fibers in the subsets mixed together forming a substantially uniform distribution.

3. The penetration resistant article of claim 1, wherein the yarns have a twist level no more than a 5 twist multiplier.

4. The penetration resistant article of claim 1, wherein the yarns have an energy to break of 10 to 25 Joules per gram.

5. The penetration resistant article of claim 1, wherein the yarns have a tenacity of 5 to 16 grams per dtex.

6. The penetration resistant article of claim 1, wherein the staple fibers have a crimp frequency of no more Than 8 crimps per centimeter.

7. The penetration resistant article of claim 1, wherein the staple fibers are selected from the group consisting of polyamide fibers, polyolefin fibers, polybenzoxazole fibers, polybenzothiazole fibers, poly{2,6-diimidazo [4,5-b4',5'-e] pyridinylene-1,4(2,5-dihydroxy)phenylene}fibers, and mixtures thereof.

8. The penetration resistant article of claim 7, wherein the staple fibers comprise aramid fibers.

9. The penetration resistant article of claim 8, wherein the staple fibers comprise poly(paraphenylene terephthalamide).

10. The penetration resistant articre of claim 1, wherein the staple fibers have a linear density of 0.4 to 5.0 dtex per fiber.

11. The penetration resistant article of claim 1, wherein the layers, combined, have an areal density of 1.0 to 5.0 kilograms per square meter.

12. The penetration resistant article of claim 1, wherein the article meets at least the Level 1 performance requirement against spike as described in NIJ Standard-0115.00.

13. The penetration resistant article of claim 1, further comprising:
    a second plurality of layers resistant to ballistic projectiles.

14. The penetration resistant article of claim 13, wherein the article meets at least the Type IIA ballistic performance requirement as described in NIJ Standard-0101.04.

15. The penetration resistant article of claim 1, wherein the woven fabric has a fabric tightness factor of 0.85 to 1.1.

16. The penetration resistant article of claim 1, wherein the fabric additionally comprises continuous multifilament yarn.

17. The penetration resistant article of claim 1, further comprising at least one layer of woven fabric made of yarn including continuous multifilaments, such fabric having a fabric tightness factor of at least 0.75 and such yarn having a linear density of less than 500 dtex.

* * * * *